(12) United States Patent
Son

(10) Patent No.: US 11,396,611 B2
(45) Date of Patent: Jul. 26, 2022

(54) HIGH-PERFORMANCE SOUND INSULATION PAINT

(71) Applicant: WAKO CO., LTD., Hiroshima (JP)

(72) Inventor: Tae Man Son, Gyeonggi-do (KR)

(73) Assignee: WAKO CO., LTD., Hiroshima (JP)

( * ) Notice: Subject to any disclaimer, the term of this patent is extended or adjusted under 35 U.S.C. 154(b) by 558 days.

(21) Appl. No.: 16/500,759

(22) PCT Filed: Mar. 8, 2018

(86) PCT No.: PCT/KR2018/002764
§ 371 (c)(1),
(2) Date: Oct. 3, 2019

(87) PCT Pub. No.: WO2018/186596
PCT Pub. Date: Oct. 11, 2018

(65) Prior Publication Data
US 2020/0062990 A1    Feb. 27, 2020

(30) Foreign Application Priority Data

Apr. 4, 2017 (KR) .................. 10-2017-0043823

(51) Int. Cl.
| | | |
|---|---|---|
| *C09D 133/08* | (2006.01) | |
| *C08K 3/34* | (2006.01) | |
| *C08K 3/40* | (2006.01) | |
| *C08K 5/101* | (2006.01) | |
| *C08K 3/22* | (2006.01) | |

(52) U.S. Cl.
CPC .............. *C09D 133/08* (2013.01); *C08K 3/34* (2013.01); *C08K 3/40* (2013.01); *C08K 5/101* (2013.01); *C08K 2003/2241* (2013.01)

(58) Field of Classification Search
CPC .......... C09D 133/08; C08K 3/34; C08K 3/40; C08K 5/101; C08K 2003/2241
USPC ........................................................ 106/600
See application file for complete search history.

(56) References Cited

U.S. PATENT DOCUMENTS

| | | |
|---|---|---|
| 2004/0211934 A1 | 10/2004 | LeStarge |
| 2011/0281978 A1 | 11/2011 | Desai et al. |
| 2015/0097136 A1 | 4/2015 | Wulff et al. |

FOREIGN PATENT DOCUMENTS

| | | | |
|---|---|---|---|
| CN | 102690576 A | | 9/2012 |
| KR | 10-2006-0006802 A | | 1/2006 |
| KR | 10-2012-0108766 A | | 10/2012 |
| KR | 20120108766 A | * | 10/2012 |
| KR | 10-2013-0030040 A | | 3/2013 |
| KR | 10-2013-0038277 A | | 4/2013 |
| KR | 10-2014-0072478 A | | 6/2014 |
| WO | 2005/118162 A1 | | 12/2005 |

OTHER PUBLICATIONS

International Search Report for PCT Application No. PCT/KR2018/002764, dated Jul. 12, 2018 in 6 pages.

\* cited by examiner

*Primary Examiner* — Kelechi C Egwim
(74) *Attorney, Agent, or Firm* — Knobbe, Martens, Olson & Bear, LLP

(57) ABSTRACT

The present invention relates to a high-performance sound insulation paint showing a sound absorption effect, and provides a sound insulation paint for coating including 15 to 25 weight % of soda-lime borosilicate glass, 36 to 46 weight % of a binder, 8 to 15 weight % of titanium dioxide, 8 to 15 weight % of aluminum potassium silicate, 20 to 30 weight % of water, and 2 to 5 weight % of Texanol.

4 Claims, 3 Drawing Sheets

HIGH-PERFORMANCE SOUND INSULATION PAINT

CROSS-REFERENCE TO RELATED APPLICATIONS

This application is the U.S. National Phase under 35. U.S.C. § 371 of International Application PCT/KR2018/002764, filed Mar. 8, 2018, which claims priority to Korean Patent Application No. 10-2017-0043823, filed Apr. 4, 2017. The disclosures of the above-described applications are hereby incorporated by reference in their entirety.

TECHNICAL FIELD

The present invention relates to a high-performance sound insulation paint (hereinafter referred to as a "sound insulation paint"), and more particularly relates to an aqueous sound insulation paint including soda-lime borosilicate glass (hereinafter referred to as "SLBG") having a spherical particulate structure, a binder, titanium dioxide, aluminum potassium silicate (hereinafter referred to as "APS") having a special flaky structure, and Texanol. The sound insulation paint may be applied to architectures such as inner and outer walls, ceilings, roofs, and so forth of buildings, and ships, especially submarines, to thereby efficiently block noise and vibrations, and is usable for military purposes. In addition, since the paint is an aqueous paint, this paint has no odor while being applied, is nontoxic to human body, and is environmentally friendly.

BACKGROUND ART

Living environments in surrounding areas are exposed to various types of noise, and it is unclear how far noise experienced in structures in close space such as apartments can be reduced. This is because when a standard level of decibel (dB), which is a parameter for conflicts about neighborhood noise, is actually measured, the measured noise level is much lower than a noise level perceived by a person. That is, neighborhood noise has become more and more complex and serious from problems concerning buildings to problems affecting lifestyles, increase in stress, occurrence of mental disorders, and relationship and communication with neighbors.

With acceleration of development of industries, sources of living noise have diversified. In particular, traffic noise has become a main cause of urban noise, and noise in houses and offices adjacent to airports or highways has become gradually apparent as a serious social problem. Thus, measures against such noise are urgently required in these days. The present invention is intended not only to insulate the living noise described above, but also to solve problems in vehicles such as ships, warships, and submarines in which introduction of noise insulation technique is strongly demanded.

The noise level can be expressed as a decibel (dB) of sound waves. The noise level in take-off or landing of a fighter aircraft is about 120 dB, horn noise of a car at a distance of 7 m is about 110 dB, the noise level perceived near a railroad when a train is passing is about 100 dB, factory noise is about 90 dB, traffic noise is about 80 dB to 70 dB, the noise level of a noisy office is about 60 dB, the noise level in quiet conversation is about 40 dB, and the noise level of a clock is about 20 dB. That is noise of about 70 dB or more can be regarded as large noise that may interfere with life.

Thus, to reduce such noise problems drastically, such noise can be solved by blocking transmission of generated noise from the beginning. Installing one of a sound insulation plate, a sound absorption plate, or a blocking wall generally that are used in general involves obtaining of a space and large costs, and thus, is not easy and economical. In view of this, a conventional technique was employed to simply prevent nose by applying a paint material including metal particles, a pigment, or other materials. This technique, however, has a problem of insufficient sound insulation effect, in addition to an antibacterial effect. Thus, development of a paint material whose sound insulation effect has been remarkably enhanced has been more urgently demanded than addition of metal particles or a specific filler.

TABLE 1

| Noise level | Noise source | Sensing level |
| --- | --- | --- |
| 20 dB | Clock noise | Sensible |
| 30 dB | Leaf rustling | |
| 40 dB | Quiet conversation | Slightly noisy |
| 50 dB | Road of quiet residential area | |
| 60 dB | Noisy office | Noisy |
| 70 dB | Automobile noise at distance of 10 m | |
| 80 dB | Noise in train | Very noisy |
| 90 dB | Noisy factory | |
| 100 dB | Noise perceived near rail load while train is passing | Extremely noisy |
| 110 dB | Horn noise at distance of 7 m | |
| 120 dB | Noise at take-off or landing of fighter aircraft | |

(Noise Level)

SUMMARY

Technical Problem

To solve the problems described above, the present invention provides an economical and efficient sound insulation paint that emits substantially no odor in application and is harmless to human body. Specifically, the sound insulation paint includes SLBG, a binder, titanium dioxide, APS, and Texanol, and is applicable to the inside or outside of buildings, submarine ships, and so forth by a coating method in order to insulate noise.

More specifically, the present invention provides a high-performance sound insulation paint for coating that shows a sound absorption effect and includes 15 to 25 weight of SLBG, 36 to 46 weight % of a binder, 8 to 15 weight % of titanium dioxide, 8 to 15 weight % of APS, 20 to 30 weight % of water, and 2 to 5 weight % of Texanol.

Solution to Problem

An object of an aspect of the present invention can be achieved by a sound insulation paint according to the present invention. Specifically, the sound insulation paint according to the present invention includes 15 to 25 weight % of SLBG, 36 to 46 weight % of a binder, 8 to 15 weight % of titanium dioxide, 8 to 15 weight % of APS, 20 to 30 weight % of water, and 2 to 5 weight % of Texanol.

The SLBG has a spherical particulate shape with a size of 100 microns or less, and is ultralight with a density of 0.12 to 0.50. Thus, the SLBG is not precipitated in the paint and floats in an upper layer during application to form a hard coating so that the coating has enhanced durability and can protect a base material for a long period. In addition, since APS has a flake structure, a plurality of minute composite layer structures are densely formed in the coating and insulates transfer of sound waves.

In the composition of the sound insulation paint, the binder is an anion dispersed-type water-soluble styrene denatured acrylate copolymer.

In another aspect of the composition of the sound insulation paint, the composition may include 0.2 to 0.4 weight % of a surfactant, and the surfactant may be at least one material selected from the group including polyoxyethylene nonylphenyl ether.

In another aspect of the composition of the sound insulation paint, the composition may include 0.2 to 0.5 weight % of a preservative.

In another aspect of the composition of the sound insulation paint, the paint may include 0.3 to 0.6 weight % of a disperser.

A commercially available Orotan 731 may be used.

In another aspect of the composition of the sound insulation paint, the paint may include 0.3 to 0.6 weight % of an antifoaming agent.

In another aspect of the composition of the sound insulation paint, the paint may include 0.1 to 0.4 weight % of a neutralizer.

In another aspect of the composition of the sound insulation paint, the paint may include 0.5 to 0.8 weight % of a refrigeration stabilizer.

In another aspect of the composition of the sound insulation paint, the paint may include 0.2 to 0.5 weight % of a thickener.

The sound insulation paints according to the aspects described above are applicable for various fields such as architectures and ships.

For example, in the case of applying the sound insulation paint to a wall surface or a floor finishing material of, for example, an apartment or a house, not only neighboring noise but also noise from outside can be insulated. In particular, in the case of applying the sound insulation paint to submarine ships, an insulation effect for noise in water can obtain sufficient effects in accordance with a desired purpose.

Advantages of the Invention

A sound insulation paint according to the present invention can drastically insulate noise as compared to sound insulation performance of sound insulation fixtures and sound insulating gypsum boards, as shown in the measured noise levels (dB) in Table 2 and the acoustical attenuation constant measurement levels (sound transmission loss) in Table 3. In addition, the insulation paint according to the present invention can be used more easily and more economically than in the case of installing a high-cost sound insulation wall or sound insulation wall. The insulation paint according to the present invention is expected to be advantageously applied to ships and submarine warships that strongly demand for introduction of a sound insulation technique, which is one of main purposes of the present invention.

DESCRIPTION OF EMBODIMENT

A composition according to the present invention has various functions. In particular, an acrylic binder has a function as an adhesive with a base plate. A disperser is compatible with the acrylic binder and water to enhance workability. A neutralizer is used to adjust a pH of the composition to enhance storage stability of the composition. In applying an ultralight filler having ultrafine particulate hollow structures to form a coating, SLBG blocks or significantly reduces noise in void layers in an upper portion of the coating for sound waves transferred to an upper layer.

In addition, since APS has a minute flaky composite-layer structure that is finely formed in a composite manner, in the course of transmission of sound waves incident through the SLBG layer to the composite layer, friction due to vibrations of air caused by sound pressure changes sound energy to thermal energy, and the energy is absorbed and extinguished.

More specifically, in a coating according to the present invention, a large amount of sound is repeatedly reflected and absorbed in both of the void layers and the composite layer that is present inside a material of the present invention, and as a result, the effect of sound insulation can be maximized.

In other words, description will be given as an effect and a principle of reducing vibrations of noise that has entered the material. The sound insulation paint according to the present invention is an environmentally friendly aqueous sound insulation paint formed by mixing an acrylic binder, SLBG, titanium dioxide, and APS at high density. Although the sound insulation paint is thin, the sound insulation effect of sound absorption and noise filtering thereof are different from a conventional sound insulation material (including paint) in terms of thickness and performance. The sound insulation paint is a ultralight and ultrathin film having a weight of 1/10 or less of a general sound insulation material and a thickness of 1/20 or less of the general sound insulation material.

Functions based on the principle of the invention described above will be described below in detail.

Figure 1:
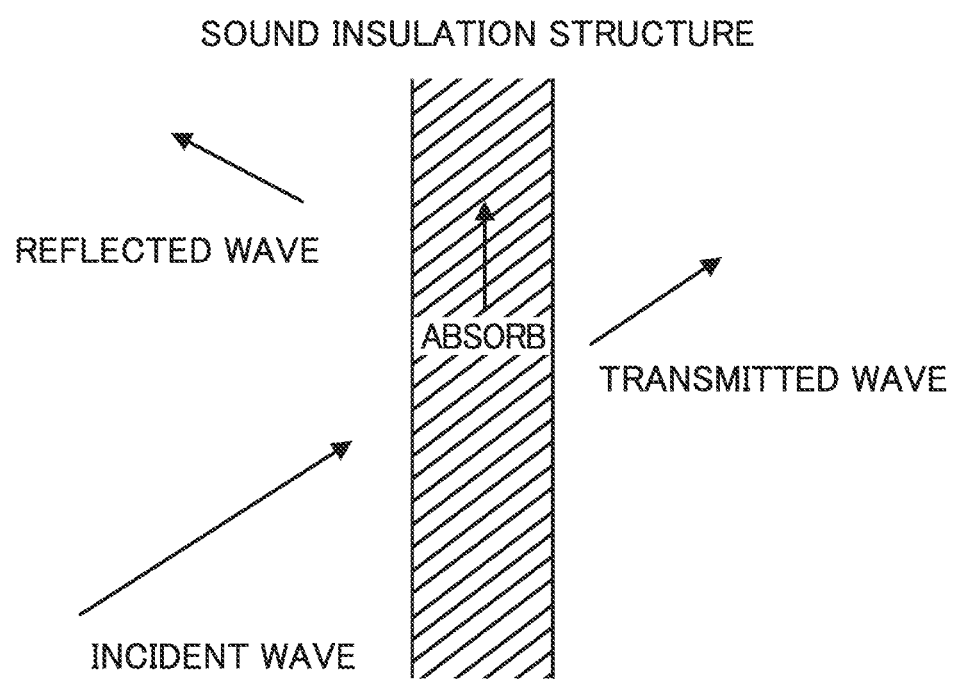
FIG. 1 is a graph showing a relationship among reflection, transmission, and absorption of sound.

FIG. 1 shows a relationship among reflection, transmission, and absorption of sound in a case where sound enters a coating film obtained by applying a sound insulation paint according to the present invention to a base material requiring measures for sound insulation in order to insulate noise (hereinafter referred to as a "sound insulation material").

For example, in a case where the sound insulation material has a transmission loss TL of 40 dB, a transmittance expressed by a ratio between an incident noise level pi and a transmission noise level pt is $\tau=(10^{(-TL/10)}/10)=0.0001$ from the equation of $TL=10\log_{10}(1/\tau)$, which means 1/10000 of the incident noise level is transmitted.

As shown in FIG. 1, the incident noise level can be expressed by $$pi = pr + pt + pa \qquad (1)$$

where Pi is an incident noise level, Pr is a reflected noise level, pt is a transmission noise level, and pa is an absorption level, and τ: transmittance (pt/pi).

From Equation (1), the sound insulation paint according to the present invention has a layered structure for obtaining layers for sound insulation and sound absorption layer in a composite manner in order to increase a sound transmission loss (acoustical attenuation constant) of the sound insulation material, based on the equation.

More specifically, since a loss of the transmission loss has a limitation in terms of mass, functionality as a sound insulation material is provided by isolation of multiple layers or hollow layers of media having different densities.

One of principles of the configuration of the present invention is as follows. Sound that has entered the sound insulation material is repeatedly reflected and absorbed in a process in which the sound passes through a large number of continuous void layers in an ultralight atomized structure disposed in an upper layer of the sound insulation material so that the transmission noise level pt decreases. Energy of sound that has passed through the void layers changes to have another pattern of sound waves at a boundary with a different material having an APS composite layer structure with a discontinuous flaky shape, and a loss of energy (in which friction of air vibrations changes kinetic energy of sound to thermal energy and the energy is lost), and thereby, sound absorption effect is enhanced.

Sound insulation is a mechanism of reflecting sound waves, whereas sound absorption is a mechanism of absorbing sound waves. The absorption of sound waves is to attenuate wave energy of sound waves, and means that kinetic energy of medium particles causes vibrations or other phenomena on the material and changes to thermal energy.

Consequently, by maximizing the volume of the ultralight void layers described above (note that as the distance between molecules increases, the amount of sound energy loss increases) and utilizing the principle of construction isolation, the sound insulation paint according to the present invention was obtained as an ultrathin film showing sound insulation and sound absorption.

The principle of the configuration of the present invention will be further described below.

Sound insulation performance in terms of mass greatly depends on the mass. In examining measures against noise, it is an important issue to obtain a sufficient mass of a sound insulation structure, but merely increasing the mass is not an effective measure. Thus, if composite layers can be constructed independently, a transmission loss thereof can obtain high sound insulation performance together with a transmission loss of each layer.

Figure 2:
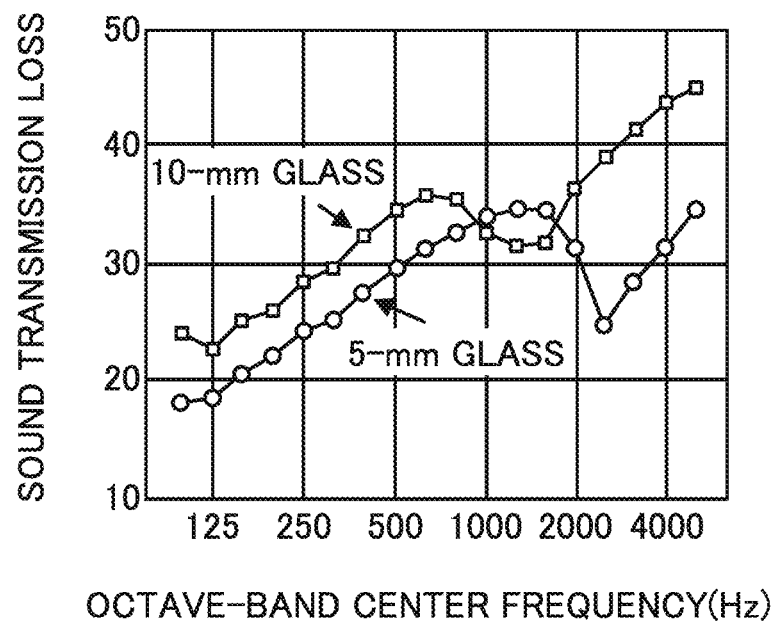
FIG. 2 is a graph showing a sound transmission loss at each frequency with respect to transmission losses of a single wall and a double wall of a general sound insulation material.
Figure 3:
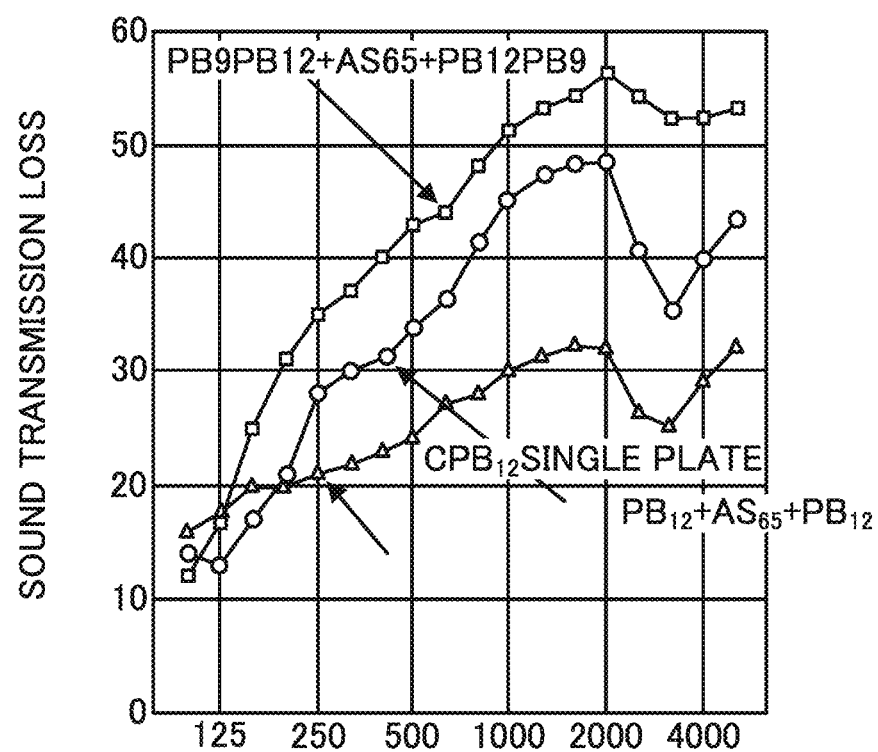
FIG. 3 is a graph showing a sound transmission loss at each frequency with respect to transmission losses of a single wall and a double wall of a general sound insulation material.

As an example, a sound transmission loss for each frequency with respect to transmission losses of a single wall and a double wall of a general sound insulation material will be described with reference to FIGS. 2 and 3.

The sound insulation paint according to the present invention can obtain high sound insulation performance and effect by an ultralight thin film with a combination of composite layers or a combination of sound of void layers.

Examples of the present invention will be more specifically described.

Example 1

First, 4 g of antifoaming agent and 22 g of Texanol were added to a mixture of 240 g of water, 3 g of a thickener, 3 g of a disperser, 2 g of neutralizer, 2 g of a preservative, 3 g of a surfactant, and 6 g of a refrigeration stabilizer while the mixture was stirred, and then the resulting mixture was uniformized. Thereafter, 100 g of titanium dioxide and 90 g of APS were added, and the resulting mixture was stirred at high speed for about 30 minutes. After it was confirmed that the degree of dispersion of the mixture was 5 or more, 400 g of an acrylic binder was added to the mixture while the mixture was stirred, and then, 200 g of SLBG was gradually supplied, and the resulting mixture was stirred at low speed for about 20 minutes.

Comparative Example 1

First, 4 g of an antifoaming agent and 22 g of Texanol were added to a mixture of 240 g of water, 3 g of a thickener, 3 g of a disperser, 2 g of a neutralizer, 2 g of a preservative, 3 g of a surfactant, and 6 g of a refrigeration stabilizer while the mixture was stirred, and then the resulting mixture was uniformized. Thereafter, 100 g of titanium dioxide and 90 g of APS were added to the mixture, and the resulting mixture was stirred at high speed for about 30 minutes. After it was confirmed that the degree of dispersion of the mixture was 5 or more, 400 g of an acrylic binder was added to the mixture while the mixture was stirred, and then, 100 g of SLBG and 100 g of magnesium silicate were gradually supplied, and the resulting mixture was stirred at low speed for about 20 minutes.

Comparative Example 2

First, 4 g of an antifoaming agent and 22 g of Texanol were added to a mixture of 240 g of water, 3 g of a thickener, 3 g of a disperser, 2 g of a neutralizer, 2 g of a preservative, 3 g of a surfactant, and 6 g of a refrigeration stabilizer while the mixture was stirred, and then the resulting mixture was uniformized. Thereafter, 100 g of titanium dioxide and 90 g of APS were added to the mixture, and the resulting mixture was stirred at high speed for about 30 minutes. After it was confirmed that the degree of dispersion of the mixture was 5 or more, 400 g of an acrylic binder was added to the mixture while the mixture was stirred, and then, 200 g of magnesium silicate was gradually supplied, and the resulting mixture was stirred at low speed for about 20 minutes.

Sound Insulation Performance Test

Test Example 1—Test by Fabricating PVC Test Plate

An evaluation was conducted by using the sound insulation paints obtained in Example 1, Comparative Example 1, and Comparative Example 2 described above. Specifically, each sound insulation paint was sprayed onto a PVC base plate (15 mm) three times (at 20° C., maintained for eight hours or more until recoating) and dried, and then, a box partitioned into two (W×L×H, each 1 m) was prepared and placed, and a gap was filled with a sealing material. Thereafter, noise transferred from one space (white noise source) to the another space was measured (with a noise measurement device).

TABLE 2

| Section | Occurring noise | Transferred (measured) noise |
|---|---|---|
| Example 1 | 60 | 39 |
|  | 100 | 66 |
| Comparative Example 1 | 60 | 47 |
|  | 100 | 79 |
| Comparative Example 2 | 60 | 53 |
|  | 100 | 91 |

(Noise Measurement Result Value (dB))

As clearly shown in the result of Table 2, in the case of applying the paint of Example 1 of the present invention, transferred noise is significantly reduced as compared to occurring noise, whereas in Comparative Example 2, transferred noise only slightly decreases. A comparison between about 15 dB of an average sound insulation level of a general fixture and about 40 dB of an average sound insulation level of a sound insulation fixture, Example 1 of the present invention shows a high level of sound insulation effect.

Test Example 2—Test by Acoustical Attenuation Constant Measurement for Each Frequency The sound insulation paint obtained by Example 1 was applied onto a glass cloth (25 mm) three times (at 20° C., maintained for eight hours or more until reapplication) and dried, and then, an acoustic coefficient for each frequency was measured based on KSF2808/2011 (insulation performance measuring method for air transfer noise of a building member). A sound transmission loss is a value obtained by multiplying, by ten, a common logarithm of an inverse number of a ratio between energy of sound that has entered the coating of Example 1 and energy of sound transmitted through the coating to the opposite side, and is represented as an acoustical attenuation constant (dB).

TABLE 3

| Section | Frequency (Hz) | Acoustical attenuation constant (dB) |
| --- | --- | --- |
| Example 1 | 125 | 18.6 |
|  | 2000 | 54.0 |
|  | 5000 | 61.2 |

(Acoustical Attenuation Constant Measurement Value (Sound Transmission Loss))

As clearly shown in the result of Table 3 above, in the case of applying the paint of Example 1 of the present invention, an acoustical attenuation constant at a frequency of 125 Hz was 18.6 dB, which is 62% of 30 or more that is a condition for authorization and certification of a management standard (Notification of Ministry of Construction and Transportation of Korea No. 1999-393) of a sound insulation structure of a wall. An acoustical attenuation constant at a frequency of 2000 Hz was 54.0 dB, which is close to 98% of 55 or more that is a condition for authorization and certification of a management standard of the sound insulation structure of the wall. The result of Table 3 shows that sound insulation exhibits high effect in a range from a low frequency to a high frequency.

TABLE 4

| Center frequency | Sound transmission loss (dB) |
| --- | --- |
| 125 Hz | 30 or more |
| 500 Hz | 45 or more |
| 2000 Hz | 55 or more |

(Authorization and Certification of Condition for Management Standard (Notification of Ministry of Construction and Transportation of Korea No. 1999-393) of Sound Insulation Structure of Wall)

Example: Test Result Table of Sound Insulating Gypsum Board (Product Name: dBcheck)

Table 5 below shows test result values on a system using a dBcheck of a sound insulating gypsum board in Korea Institute of Civil Engineering and Building Technology (KICT).

TABLE 5

| Section/System | | | System 1 | System 2 |
| --- | --- | --- | --- | --- |
| System detail (mm) | Thickness and type of gypsum board | Finishing Base | 15 15 | 15 15 |
|  | Stud width |  | 65 | 65 |
|  | Heat insulator (50 mm) |  | Rock wool 50 K | Glass Wool 24 K |
|  | Structure |  |  |  |
|  | Frequency | Certification condition | System 1 | System 2 |
| Result value (dB) | 125 Hz | 30 or more | 37 | 41 |
|  | 500 Hz | 45 or more | 49 | 61 |
|  | 2000 Hz | 55 or more | 56 | 69 |

The total thickness of the structure was 80 mm (except for the stud), and it is known that the KCC sound insulating gypsum board is constructed to have a double-wall structure with a total thickness of 50 mm (except for the stud).

What is claimed is:

1. A sound insulation paint comprising:
   15 to 25 weight % of soda-lime borosilicate glass;
   36 to 46 weight % of a binder;
   7 to 15 weight % of titanium dioxide;
   8 to 15 weight % of aluminum potassium silicate;
   20 to 30 weight % of water; and
   2 to 5 weight % of Texanol, wherein
   the aluminum potassium silicate includes 30 to 50 weight % of silica, 10 to 20 weight % of aluminium oxide, 10 to 27 weight % of magnesium oxide, 3 to 17 weight % of iron oxide, 5 to 15 weight % of potassium oxide, and 1 to 3 weight % of other oxides, and has a bulk density of 0.3 to 0.4.

2. The sound insulation paint according to claim 1, wherein the binder is an anion dispersed-type water-soluble styrene denatured acrylate copolymer.

3. The sound insulation paint according to claim 1, wherein soda-lime borosilicate glass includes 70 to 80 weight % of silica, 5 to 15 weight % of calcium oxide, 3 to 8 weight % of sodium oxide, and 2 to 7 weight % of boron, and has a density of 0.38 or less.

4. The sound insulation paint according to claim 1, further comprising 0.1 to 0.4 weight % of a neutralizer, wherein
   the neutralizer is one of a material selected from the group consisting of 2-amino-2-methyl-1-propanol and aqueous ammonia, and
   the sound insulation paint further includes 0.5 to 0.8 weight % of a refrigeration stabilizer, 0.2 to 0.4 weight % of a surfactant, 0.3 to 0.5 weight % of a preservative, 0.3 to 0.6 weight % of a disperser, 0.3 to 0.6 weight % of an antifoaming agent, and 0.3 to 0.5 weight % of a thickener.

* * * * *